(12) United States Patent
Hoch et al.

(10) Patent No.: US 10,234,990 B2
(45) Date of Patent: Mar. 19, 2019

(54) MAPPING OF POSITION MEASUREMENTS TO OBJECTS USING A MOVEMENT MODEL

(71) Applicant: Microchip Technology Incorporated, Chandler, AZ (US)

(72) Inventors: Martin Hoch, Gilching (DE); João Ferreira, Gilching (DE); Axel Heim, Munich (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 136 days.

(21) Appl. No.: 15/278,534

(22) Filed: Sep. 28, 2016

(65) Prior Publication Data

US 2017/0300173 A1    Oct. 19, 2017

Related U.S. Application Data

(60) Provisional application No. 62/234,321, filed on Sep. 29, 2015.

(51) Int. Cl.
*G06F 3/041* (2006.01)
*G06F 3/0488* (2013.01)

(52) U.S. Cl.
CPC ........ *G06F 3/0418* (2013.01); *G06F 3/04883* (2013.01); *G06F 2203/04108* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2012/0235938 A1 | 9/2012 | Laubach | 345/173 |
| 2014/0055352 A1* | 2/2014 | Davis | G06F 3/017 345/156 |
| 2016/0188113 A1* | 6/2016 | Alpman | G06F 3/0418 345/173 |
| 2016/0364010 A1* | 12/2016 | Amma | G06K 9/00355 |

FOREIGN PATENT DOCUMENTS

| | | | | |
|---|---|---|---|---|
| EP | 1772800 A2 | 4/2007 | | G06F 3/042 |
| EP | 2244173 A2 | 10/2010 | | G06F 3/041 |
| WO | 2009/146544 A1 | 12/2009 | | G06F 3/042 |

OTHER PUBLICATIONS

International Search Report and Written Opinion, Application No. PCT/EP2016/073371, 17 pages, dated Jan. 2, 2017.
Kuhn, Harold W., "Chapter 2: The Hungarian Method for the Assignment Problem," Naval Research Logistics Quarterly, 2, 19 pages, 1955.

(Continued)

*Primary Examiner* — Duane N Taylor, Jr.
(74) *Attorney, Agent, or Firm* — Slayden Grubert Beard PLLC

(57) ABSTRACT

A position tracking system may include a processor and a memory coupled to the processor. The memory may include instructions that, when loaded and executed by the processor, cause the processor to receive a plurality of measurements from a sensor and map a location of an object to a measurement using movement models. The mapping may be based upon a cost computed from movement models, the measurement, and the location.

17 Claims, 4 Drawing Sheets

(56) References Cited

OTHER PUBLICATIONS

Microchip Technology Incorporated, "MGC3130—Sabrewing Single-Zone Evaluation Kit User's Guide," URL: http://ww1.microchip.com/downloads/en/DeviceDoc/41685A.podf, 34 pages, © 2013.
Microchip Technology Incorporated, "MTCH6303 Projected Capacitive Touch Controller Data Sheet," URL: http://ww1.microchip.com/downloads/en/DeviceDoc/40001803A.pdf, 69 pages, Jan. 27, 2015.

* cited by examiner

MAPPING OF POSITION MEASUREMENTS TO OBJECTS USING A MOVEMENT MODEL

CROSS-REFERENCE TO RELATED APPLICATIONS

This application claims priority to commonly owned U.S. Provisional Patent Application No. 62/234,321 filed Sep. 29, 2015, which is hereby incorporated by reference herein for all purposes.

TECHNICAL FIELD

The present disclosure relates to signal processing for tracking of moving objects such as signal processing for systems for detecting gestures performed by an object such as a hand or finger of a user.

BACKGROUND

Sensor systems have been developed to provide for touching and non-touching input systems capable of detecting and analyzing gestures to provide enhanced control functions of an electronic device. Touch detection systems usually use a capacitive system with horizontal and vertical electrodes arranged in a matrix. Mutual and self-capacitance measurement can be used to determine one or more touch points. A controller can be configured to track movements and evaluate gestures. An exemplary touch controller is the MTCH6303 manufactured by the assignee of the present application. The application note "MTCH6303 Projected Capacitive Touch Controller Data Sheet", DS40001803, available from Microchip Technology Inc. is hereby incorporated by reference in its entirety.

In some sensor systems, mapping measured touch positions to contact identifiers (IDs) is a combinatorial assignment problem that is solved by calculating distances between measured touch positions and predicted positions of known contacts and determining optimum assignments based on those distances. While in the context of touch sensor systems, the terms 'contact' and 'contact identifiers' may be used interchangeably. Furthermore, the present disclosure may also use the terms 'object' and 'object identifier' as synonyms to the use of 'contact' and 'contact identifiers'.

SUMMARY

According to various embodiments, the cost function for the mapping of a newly measured position to a contact is derived from the state of a stochastic model for the contact's movement, in contrast to a trivial distance measurement. Thus the cost function can account for speed and direction of the movement that is estimated by the self-adjusting model, as well as the likelihood of acceleration parallel and perpendicular to the direction of movement.

In an object tracking system, the task is encountered to solve the combinatorial assignment problem of measured positions to objects. Thereto, a cost matrix is made up of the individual 'costs' for the assignment of each measured position to each object. The optimum assignment then can be determined by means of, e.g., the Hungarian (Kuhn-Munkres) algorithm [Harold W. Kuhn, "The Hungarian Method for the assignment problem", Naval Research Logistics Quarterly, 2: 83-97, 1955].

The optimum assignment typically may include the assignment with minimum total cost.

The cost for each assignment may be a simple metric like the Manhattan distance or the (squared) Euclidean distance between the newly measured touch positions and the recent (or predicted) positions of the contacts. In our new approach, this metric is derived from a movement model.

Embodiments of the present disclosure include a position tracking system. The system may include a processor and a memory coupled to the processor. The memory may include instructions that, when loaded and executed by the processor, cause the processor to receive a plurality of measurements from a sensor and map an estimated location of an object to a measurement using a stochastic model. The mapping may be based upon a cost relating to the location and the measurement. The stochastic model may be based on the location.

Furthermore, embodiments of the present disclosure include a non-transitory computer-readable medium including instructions. The instructions, when loaded and executed by a processor, cause the processor to receive a plurality of measurements from a sensor and map an estimated location of an object to a measurement using a stochastic model. The mapping may be based upon a cost relating to the location and the measurement. The stochastic model may be based on the location.

Also, embodiments of the present disclosure include a method. The method may include receiving a plurality of measurements from a sensor and mapping an estimated location of an object to a measurement using a stochastic model. The mapping may be based upon a cost relating to the location and the measurement. The stochastic model may be based on the location.

DETAILED DESCRIPTION

Figure 1:
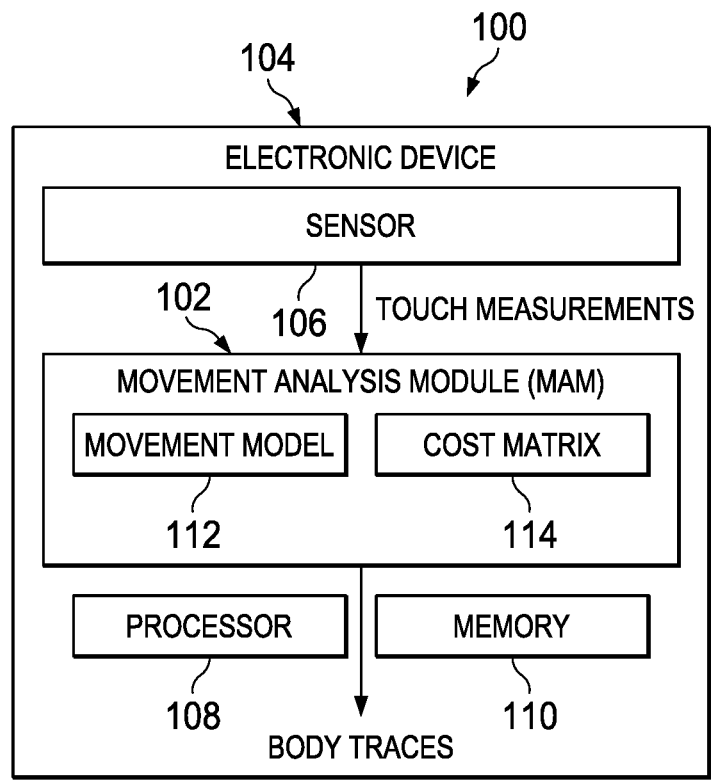
FIG. 1 illustrates an example embodiment of a system for tracking the movement of objects.

FIG. 1 is an illustration of an example embodiment of a system 100 for tracking movement of objects. System 100 may track objects such as fingers, hands, other body parts, or entire objects. The objects may be tracked as they interface with or operate near an electronic device, such as electronic device 104. While objects to be tracked are not shown in FIG. 1, these objects to be tracked may touch, nearly touch, or otherwise be within sensing range of a sensor or a set of sensors. In one embodiment, system 100 may track movement of objects by predicting where an object will be located in the future. Given a measurement from a sensor, system 100 may determine whether the measurement is noise, from an object, or from which object of more than one objects that might be tracked by electronic device 104. In one embodiment, system 100 may make such a determination based upon a probabilistic model that relates the new measurement to a prior measurement or calculated trace of an object's movement. In another embodiment, system 100 may make such a determination by assigning a measurement a higher probability that it is related to prior linear movement, acceleration, or deceleration of an object rather than perpendicular movement of the object.

Any suitable sensor may be used in system 100 tracking the movement of objects. For example, electronic device 104 may include sensor 106. Sensor 106 may be implemented as a touch sensor or proximity sensor, such as capacitive, optical, infra-red, ultrasound, or other sensors to detect and trace a movement of an object such as a user's hand.

Sensor 106 may issue measurements for analysis. System 100 may include any suitable mechanism for analyzing measurements from sensor 106 and determining whether such measurements are to be assigned to a particular object that has been sensed. Furthermore, system 100 may include any suitable mechanism for mapping traces of movement of such objects. For example, system 100 may include movement analysis module (MAM) 102. MAM 102 may be implemented in any suitable manner. For example, MAM 102 may be implemented in hardware, software, analog circuitry, digital circuitry, reconfigurable logic, or any suitable combination thereof. In one embodiment, MAM 102 may be implemented by instructions in a computer-readable medium such as memory 110, which, when executed by a processor 108, may configured MAM 102 to perform the operations described in this disclosure. In such a case, MAM 102 may be implemented by one or more functions, code, processes, scripts, executables, applications, objects, or other entities for execution on processor 108. Processor 108 may be implemented in any suitable manner, such as by a field programmable gate array (FPGA), application specific interface circuit (ASIC), microcontroller, or general purpose reconfigurable processor. In various embodiments, MAM 102 may include or be communicatively coupled to movement models 112 and cost matrix 114.

MAM 102 may be configured to track any suitable number of objects or dimensions. In the examples below, MAM 102 is shown tracking two fingers with respect to a trackpad, display input, or other similar input to electronic device 104. However, the operations and configuration of MAM 102 may be expanded from these examples into tracking any suitable number and kind of objects, depending upon the availability of sensors. For example, MAM 102 may be configured to track multiple objects in positioning systems in consumer electronics, two or three dimensional spaces, medicine (such as tracking of moving particles in blood vessels), military target tracking, robotics, video surveillance, indoor and/or outdoor positioning systems. In some instances, an object may be tracked that might not be of interest to an end user. For example, a water drop on a two-dimensional touch pad may cause measurements similar to the touch of a finger. However, in the end such an object should be ignored for higher-level applications. These objects could have different movement models than target objects.

Figure 2:
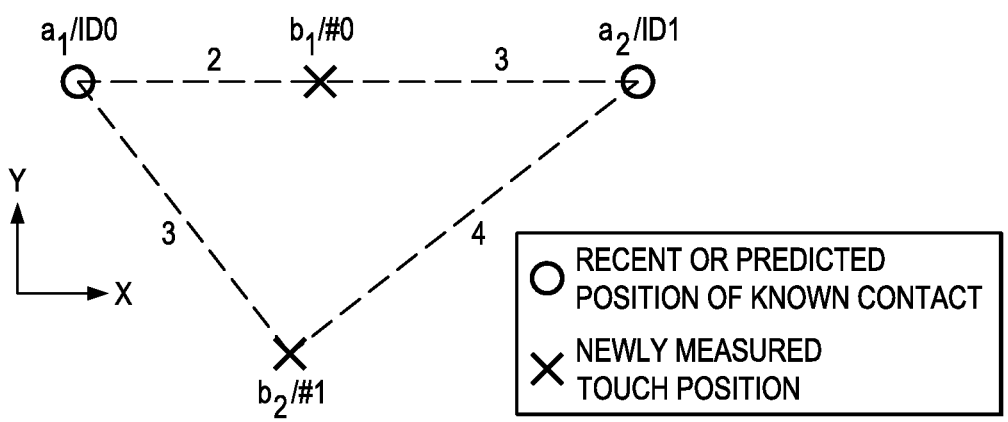
FIG. 2 illustrates measurements made for tracking the movement of objects.

FIG. 2 is an illustration of example touch data. Given two objects (such as fingers) ID0 and ID1, such objects may have previously been determined to be in respective positions shown in FIG. 2 by the circle marks. Such a determination may have itself have been a prediction or estimation. While being able to determine and track two-dimensional or three-dimensional movements, MAM 102 may thus map these reference points to object traces.

Consider two new measurements, denoted as #0 and #1 in FIG. 2 and shown using cross marks. MAM 102 may be configured to determine whether each of these measurements belongs to the already-tracked objects, to newly detected objects, or to no objects at all. For example, such measurements might have been noise or inadvertent touches.

Other applications may assign measurements #0 and #1 to either of objects ID0 and ID1 based upon (squared) Euclidean distance, Manhattan distance, or other distance from the respective objects. For example, measurement #0 is three cost units from ID1 and two cost units from ID0. Thus, based upon this simple comparison, measurement #0 might be assigned to ID0. However, at the same or nearly the same time, measurement #1 was made. It may be determined that measurement #1 is four units from ID1 and thee units from ID0, and thus, without any other considerations, measurement #1 would also be assigned to ID0. However, both measurements cannot both contemporaneously be attributed to the same object. As a result, some tracking models may apply a combinatorial assignment algorithm to determine which measurement belongs to which object, if any. Even with such combinatorial assignment algorithms, errors may be made.

Figure 3:
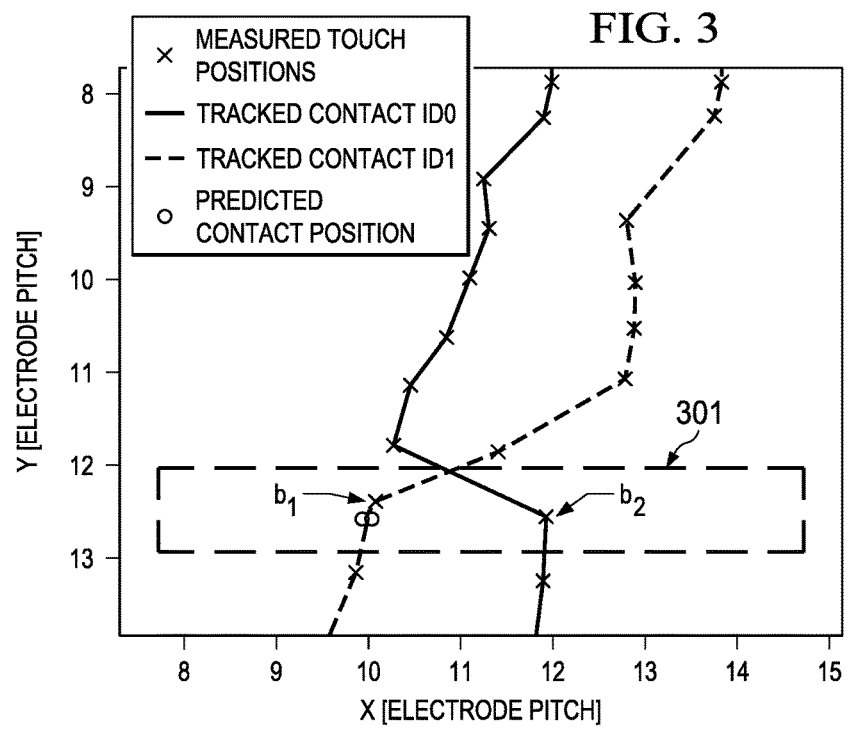
FIG. 3 illustrates an example analysis of the movement of objects using Euclidean distances.

For example, FIG. 3 illustrates the mapping of measurements to tracked objects that may be made as a result of the squared Euclidean distance from the measurements to the last known or calculated positions of the objects. FIG. 3 illustrates an X-Y plot of the movement of two objects (ID0 and ID1) from the top of the graph moving towards the bottom of the graph. Each cross "x" in the figure represents a measurement. Previous measurements may have been attributed to one of the traces of the objects as they moved through the graph.

Within area 301 represents, a new set of measurements may be found, measurement position $b_1$ is at approximately x=10 and measurement position $b_2$ is at approximately x=12. Given a distance-only determination, whether using Euclidean or another distance, measurement position $b_1$ might be attributed to ID1 and measurement position $b_2$ might be attributed to ID0. This may be because the distance between $b_1$ and the predicted contact position of ID1 plus the distance $b_2$ and the predicted contact position of ID0 is smaller than the distance between $b_1$ and the predicted contact position of ID0 plus the distance between $b_2$ and the predicted contact position of ID1. The distance calculation determination might thus cause a crisscrossed trace which is likely to be incorrect. This may result from conventional touch mapping, wherein mapping of measured touch positions to contact identifiers is a combinatorial assignment problem, which could be solved (incorrectly) by calculating the distances between all measured touch positions and the predicted positions of all known contacts, then determining the optimum assignment based on those distances. The assignment of measurements from the cost matrix may be made to individual objects using, for example, the Hungarian (Kuhn-Munkres) algorithm [see Harold W. Kuhn, "The Hungarian Method for the assignment problem", Naval Research Logistics Quarterly, 2: 83-97, 1955)]. However, in reality this may be an unlikely correct mapping as, for example, two fingers are likely to have maintained their previous parallel trace operation.

Accordingly, in one embodiment MAM 102 may utilize different cost functions for the mapping of a newly measured position to an object. Such cost functions may differ from other distance-only calculations. In a further embodiment, the cost functions may be based upon stochastic models of the objects' movement.

Figure 4:
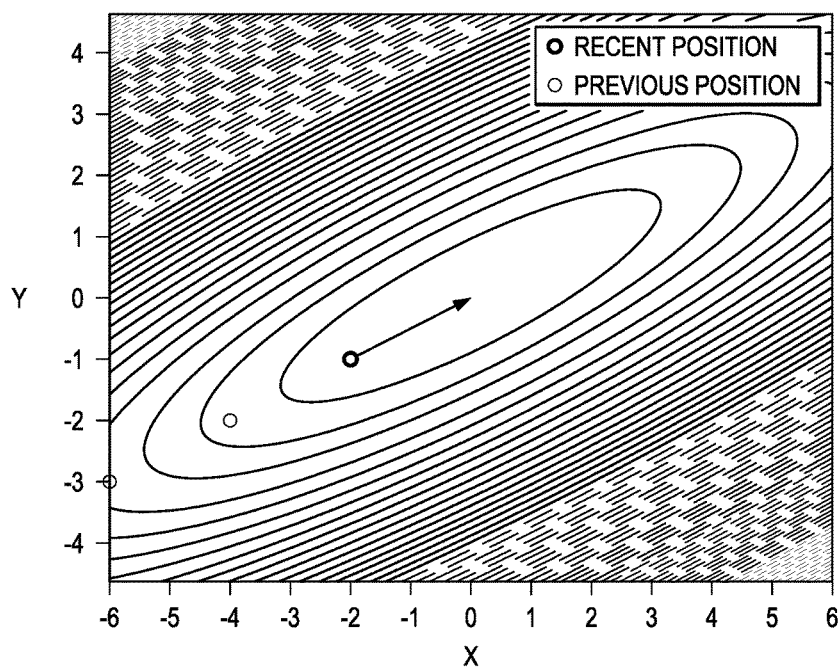
FIG. 4 illustrates an example embodiment of a cost function obtained from a movement model.

FIG. 4 is an illustration of cost function values with a stochastic model that may be applied by MAM 102, in accordance with embodiments of the present disclosure. The stochastic model may implement, fully or in part, movement models 112. MAM 102 may apply the stochastic model to the measurements received from sensor 106 to yield a cost matrix 114, from which the optimum mapping may be determined. The stochastic model may take into account previous positions and, from such positions, speed, acceleration, or jerk. Moreover, the stochastic model may take into account direction of the movement, including angle, arc, and derivatives thereof. The stochastic model may identify, given current or predicted position and one or more of these other parameters, the probability that the next measurement of the object will be at any given position within the domain space (XY or additional dimensions) space. Various portions of the domain space may be defined as representative of a probability. The portions may be defined with isolines as shown in FIG. 4. The portions containing the most recent position may be the highest probability. The portions moving away from this first portion may represent decreasing probability. Any suitable initial probability value for the first portion and any gradient probability may be used.

A stochastic model may be generated or applied for each object that is being tracked. Thus, given a new measurement, MAM 102 may apply the stochastic model of each object to the new measurement to determine the probability that the new measurement belongs to each respective object. The results of this analysis may be stored in a matrix such as cost matrix 114. Subsequently, MAM 102 may apply an optimization routine to determine, for one or more measurements, the best fit for the measurements as mapped to the various objects or determined to be noise.

The particular shape of the isolines representing the various cost function values that a next measurement will be related to the present position estimate may be determined according to any suitable criteria. For example, the faster that the object has been moving, the greater the probability that future measurements within the trajectory of the object will map to the object. Thus, the object's movement may be used to determine the stochastic model. The cost function determined by the stochastic model may take into account speed and direction of the movement of the object being modeled. In one embodiment, the stochastic model may be self-adjusting. As the object moves and changes direction, the parameters and variables of the stochastic model may be recalculated.

In one embodiment, the stochastic model may define that it is more likely that the object will move with linear, rather than perpendicular, acceleration or deceleration. Thus, it is more likely that the object that is being tracked will speed up or down in the preexisting trajectory (linear or otherwise) rather than change direction. The oval isolines shown in FIG. 4 reflect such probabilities.

The stochastic model may assume that an object will tend to keep moving at constant speed in constant direction (Newtonian movement), such as shown by the arrow in FIG. 4. Some measurements may include random elements, due to noise or intentional movement of the object. The probability distribution defining the isolines and probability values may be made according to a distribution, such as Gaussian distribution, applied to Newtonian movement of the object. The probability may be assigned assuming that movement is constant. Accelerations parallel to the direction of movement may be predicted to be more likely than accelerations perpendicular to the direction of movement. The probability distribution for deviation has a greater variance in linear or parallel direction of movement than in the direction orthogonal to it as shown in the contours of FIG. 4.

The stochastic model may maintain a set of parameters for each tracked object. The variances of the probability distribution may be constant or adapted to the current speed, acceleration, jerk, angle, or trajectory of the object's movement. The metric for assigning a measurement to an object is the probability (or log-likelihood) that a measurement position is obtained with the respective object's movement model.

The stochastic model may be adapted from the model upon which Kalman filters are based. A Kalman filter includes a prediction stage, wherein a new position estimate is predicted from the old model state, deterministic input, and an auto-adjusted estimate of the variances of random process noise. The position estimate would typically directly be contained in the filter state. The stochastic model may be based upon the position estimate of the object, control input from the object's presumed constant movement, and the process noise may be implemented by random deviation from the predicted position. Changes to other uses of the Kalman filters may include distinguishing process noise variances in the direction of movement and orthogonal to the direction of movement, rather than only to distinguishing movement in x- and y-directions.

The stochastic model may be based on Gaussian distributions with parameters determined in a suitable manner. In one embodiment, for a Gaussian distributed random variable z with a mean value μ, standard deviation σ, and a probability distribution $$f(z) = \frac{1}{\sqrt{2\pi\sigma^2}} e^{-(z-\mu)^2/2\sigma^2}$$

the (log) likelihood function may be defined as $$L(z) := -(z-\mu)^2/\sigma^2.$$

The joint probability distribution of two such random variables—if they are uncorrelated—is the product of their individual probability distributions, similar to a bivariate Gaussian probability distribution with uncorrelated components. The corresponding likelihood function is the sum of the two individual likelihood functions. For a tracked object with index i in a two dimensional Cartesian coordinate systems with dimensions x and y, let $a_i = [x_{a,i}, y_{a,i}]$ be the expected position, $v_i = [v_{x,i}, v_{y,i}]$ be the expected amount of movement, and $\sigma_\|$ and $\sigma_\perp$ be the standard deviation for movement parallel and perpendicular to the expected direction of movement, respectively. It may be assumed that parallel movement and perpendicular movement are uncorrelated. Accordingly, the likelihood that a point $b = [x_b, y_b]$ is measured is (omitting constant terms)

$$L_i(b) = -(|(b-a_i)\cdot v_i^T|^2/\sigma_\|^2 + \|(b-a_i)\times v_i\|^2/\sigma_\perp^2)/|v_i\cdot v_i^T|^2$$

where by the inner product of $(b-a_i)$ with $v_i$—denoted by the operator "·"—the part of $(b-a_i)$ in direction of $v_i$ is extracted, and where by the outer product of $(b-a_i)$ with $v_i$—denoted by the operator "×"—the part of $(b-a_i)$ perpendicular to the direction of $v_i$ is extracted, the Euclidean norms of vectors and scalars are denoted by $\|\cdot\|$ and $|\cdot|$, respectively, and $.^T$ denotes the vector transpose. In FIG. 2, $a_i = [0, 0]$, $v_i = [2, 1]$, $\sigma_\| = 1$, and $\sigma_\perp = 0.25$. If the expected movement is zeros ($v_i = [0, 0]$), an exception is required. Then, no direction of movement is favored, and the likelihood can be calculated by $$L_i(b) = -\|b-a_i\|^2/\sigma_\|^2,$$

i.e., it depends on the Euclidean distance of b and $a_i$.

Figure 5:
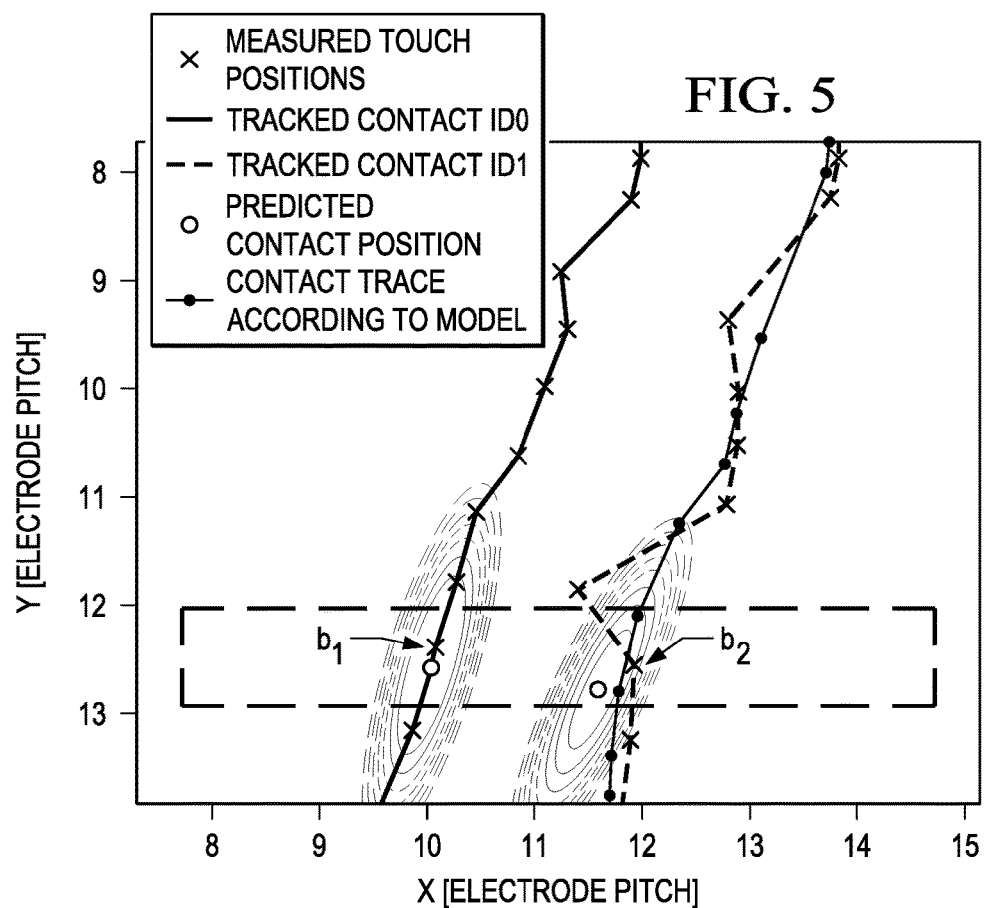
FIG. 5 illustrates an example analysis of the movement of objects using a stochastic model.

FIG. 5 illustrates example operation of MAM 102, in accordance with embodiments of the present disclosure. In FIG. 5, MAM 102 may have created traces according to the movement model prior to the detection of the measured touch positions. Superimposed over each trace are the probability models showing how likely for each tracked object that a measurement within given regions will be attributable to that object. The measured touch positions may be the same as shown in FIG. 3. However, in FIG. 5, using the stochastic model may have traced the trajectory of object ID1 and applied the stochastic model from the trace. The model as shown on the domain in FIG. 5 shows that MAM 102 expects future touches from ID1 to likely occur within various portions of the domain in a series of isolines on the right, while future touches from ID0 are likely to occur within portions of the domain in a series of isolines on the left. The measurement $b_1$ at approximately x=10 falls within a high probability of the ID0 model, and the measurement $b_2$ at approximately x=12 falls within a moderate probability of the ID1 model. This is because measurement $b_2$ is generally within the previous trajectory of ID1, representing a deceleration in the same direction of the trajectory, rather than a perpendicular movement (as would be the case if it was associated with ID0 or if measurement $b_1$ were the ID1 object). Also, the positions which the prediction of the new positions are based on, are already on the smoothened trace. Thus, rather than crossing over each other, the traces of ID0 and ID1 remain in parallel.

Accordingly, MAM 102 may track positions and map positions $a_i$ from a set A to a position $b_j$ from set B (or vice-versa) based on a cost or distribution function $F_i(a_i, b_j)$. $F_i$ may be changed or generated based upon position $a_i$. A may be a set of position estimates associated with tracked objects. B may be a set of position estimates obtained from measurement data. $F_i$ may return a likelihood (or inversely: cost, distance) measure for $a_i$ and $b_j$. The return value may be high/low when the likelihood of the pair $(a_i, b_j)$ is high/low. The function $F_i$ may depend upon the history of $a_i$, wherein the likelihood changes differently in direction of movement of $a_i$ and in a direction orthogonal to the movement of $a_i$. Typically, the likelihood decreases slower in direction of movement of $a_i$ than it decreases in direction orthogonal to the movement of $a_i$. The function $F_i$ may provide a cost output value for input position pair $(a_i, b_j)$ that can be used to compute the total cost. In one embodiment, $F_i$ may be a multivariate Gaussian function with a mean value $a_i$. $F_i$ may be centered around $a_i$. Kalman filtering may be applied to track the object positions, wherein $a_i$ is the position resulting from the Kalman prediction stage for a given tracked object. The Gaussian function may have different variances in different directions, including different variances in the direction of movement of a, and orthogonal directions of the movement of $a_i$. The variances of the Gaussian function may be adapted or constant and, moreover, may be taken from a Kalman filter used to track the object position.

Figure 6:
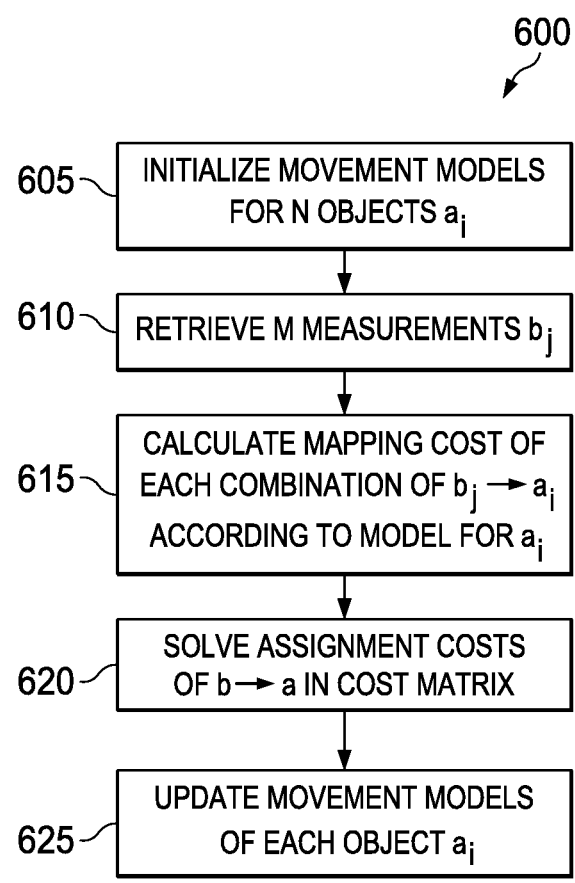
FIG. 6 illustrates an example embodiment of a method for tracking the movement of objects.

FIG. 6 is an illustration of an example embodiment of a method 600 for tracking the position of objects. In one embodiment, method 600 may be implemented in software. Method 600 may be implemented by any suitable mechanism, such as system 100.

At 605, the method is set up to track up to N objects. Such objects may be tracked through, for example, two or three different dimensions. The objects may be tracked, for example, by a touch or proximity sensor. Stochastic movement models may be initialized for each object.

At 610, measurements b may be received from the sensors.

At 615, a stochastic model for each object a may be evaluated for each measurement $b_j$. The stochastic model may be based upon the position, angle, movement, speed, acceleration, jerk, or other suitable parameters of the object. These parameters may arise from prior execution of method 600. The results of these evaluations may be the probability, likelihood, or cost function to associate a measurement with an object. The results of the cost function may be used to populate a cost matrix C. Thus, for each of N objects $a_i$ (i=1 ... N) and M measurements $b_j$ (j=1 ... M), for each measurement $b_j$, and each body $a_i$, an entry (i,j) of cost matrix C is assigned a cost of mapping $b_j$ to $a_i$ according to a model for $a_i$. The model for each instance of $a_i$ may be different.

At 620, the problem of assigning measurements b to objects a may be solved with cost matrix C according to a cost optimization algorithm.

At 625, variables of the movement models may be updated, for example, the traces of objects, angle, speed, acceleration, jerk, and the probabilities of movement in direction of movement and perpendicular to it. Thereby, the respective newly assigned measurement b may be considered.

Method 600 may optionally terminate or repeat as necessary.

Although an example order of steps is shown, the steps of the methods discussed above may be performed in any order. Moreover, one or more steps may be optionally repeated, performed in parallel, or omitted. Method 600 may be performed multiple times. The methods may be performed beginning at any suitable initialization point.

Although example embodiments have been described above, other variations and embodiments may be made from this disclosure without departing from the spirit and scope of these embodiments.

What is claimed is:

1. A position tracking system, comprising:
   at least one processor;
   at least one computer-readable medium communicatively coupled to the processor, the medium including instructions, when loaded and executed by the processor, for causing the processor to:
   receive a plurality of measurements from one or more sensors representing a single instance in time; and
   map locations of objects to measurements using movement models, the movement models include stochastic models based on a Gaussian distribution function applied to a Newtonian movement, wherein the mapping is based upon costs computed from the movement models, the measurement data, and the locations, including:
   for a given measurement, determine whether the given measurement is a location for a first object or a second object based upon costs computed from the movement models, the measurement data, and the locations.

2. The position tracking system according to claim 1, wherein the measurements include position data.

3. The position tracking system according to claim 1, wherein the movement models are based upon the past trajectory of the objects.

4. The position tracking system according to claim 1, wherein the movement models include probability variances that are different between a direction of movement of the objects and a direction orthogonal to movement of the objects.

5. The position tracking system according to claim 1, wherein the movement models include probabilities that are greater for a direction of movement of the objects than for a direction orthogonal to movement of the objects.

6. The position tracking system according to claim 1, wherein variances of the movement models to determine probabilities with respect to a direction of movement of the objects and a direction orthogonal to movement of the objects are taken from a Kalman filter.

7. At least one non-transitory computer-readable medium comprising instructions, the instructions, when loaded and executed by a processor, cause the processor to:
  receive a plurality of measurements from one or more sensors representing a single instance in time; and
  map locations of objects to measurements using movement models, the movement models include stochastic models based on a Gaussian distribution function applied to a Newtonian movement, wherein the mapping is based upon costs computed from the movement models, the measurements, and the locations, including:
    for a given measurement, determine whether the given measurement is a location for a first object or a second object based upon costs computed from the movement models, the measurement data, and the locations.

8. The medium according to claim 7, wherein the measurement data includes position data.

9. The medium according to claim 7, wherein the movement models are based upon the past trajectory of the objects.

10. The medium according to claim 7, wherein the movement models include probability variances that are different between a direction of movement of the objects and a direction orthogonal to movement of the objects.

11. The medium according to claim 7, wherein the movement models include probabilities that are greater for a direction of movement of the objects than for a direction orthogonal to movement of the objects.

12. The medium according to claim 7, wherein variances of the movement models to determine probabilities with respect to a direction of movement of the objects and a direction orthogonal to movement of the objects are taken from a Kalman filter.

13. A method, comprising:
  receiving a plurality of measurements from one or more sensors representing a single instance in time; and
  mapping a location of objects to measurements using movement models, the movement models include stochastic models based on a Gaussian distribution function applied to a Newtonian movement, wherein the mapping is based upon a costs computed from movement models, the measurements, and the locations, including:
  for a given measurement, determining whether the given measurement is a location for a first object or a second object based upon costs computed from the movement models, the measurement data, and the locations.

14. The method according to claim 13, wherein the measurements include position data.

15. The method according to claim 13, wherein the movement models are based upon a past trajectory of the objects.

16. The method according to claim 13, wherein the movement models include probability variances that are different between a direction of movement of the objects and a direction orthogonal to movement of the objects.

17. The method according to claim 13, wherein the movement models include probabilities that are greater for a direction of movement of the objects than for a direction orthogonal to movement of the objects.

* * * * *

UNITED STATES PATENT AND TRADEMARK OFFICE
CERTIFICATE OF CORRECTION

PATENT NO. : 10,234,990 B2
APPLICATION NO. : 15/278534
DATED : March 19, 2019
INVENTOR(S) : Martin Hoch et al.

Page 1 of 1

It is certified that error appears in the above-identified patent and that said Letters Patent is hereby corrected as shown below:

On the Title Page

(71) Applicant: MICROCHIP TECHNOLOGY INCORPORATED, Chandler, AZ (US)
Change to:
(71) Applicant: MICROCHIP TECHNOLOGY GERMANY GMBH, Rosenheim, Germany (DE)

Also:

(73) Assignee: MICROCHIP TECHNOLOGY INCORPORATRED, Chandler, AZ (US)
Change to:
(73) MICROCHIP TECHNOLOGY GERMANY GMBH, Rosenheim, Germany (DE)

Signed and Sealed this
Seventh Day of May, 2019

Andrei Iancu
*Director of the United States Patent and Trademark Office*